(12) United States Patent
Mollenkopf

(10) Patent No.: US 7,099,402 B2
(45) Date of Patent: Aug. 29, 2006

(54) TRANSMITTER SYSTEM AND METHOD FOR A WIRELESS COMMUNICATION SYSTEM

(75) Inventor: Steven M. Mollenkopf, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 841 days.

(21) Appl. No.: 10/223,829

(22) Filed: Aug. 19, 2002

(65) Prior Publication Data

US 2003/0035493 A1    Feb. 20, 2003

Related U.S. Application Data

(60) Provisional application No. 60/313,765, filed on Aug. 20, 2001.

(51) Int. Cl.
*H04L 27/12* (2006.01)
(52) U.S. Cl. .................................................... 375/295
(58) Field of Classification Search ........ 375/295–298, 375/260, 261, 285; 370/206, 210; 455/114.2, 455/114.3
See application file for complete search history.

(56) References Cited

U.S. PATENT DOCUMENTS

| | | | |
|---|---|---|---|
| 5,930,301 A | 7/1999 | Chester et al. | 375/296 |
| 6,268,818 B1 | 7/2001 | Xin et al. | 341/152 |
| 6,307,435 B1 * | 10/2001 | Nguyen et al. | 330/149 |
| 6,584,068 B1 * | 6/2003 | Alard | 370/208 |
| 6,950,478 B1 * | 9/2005 | Rothenberg | 375/295 |

FOREIGN PATENT DOCUMENTS

| | | |
|---|---|---|
| WO | 0007301 | 2/2000 |
| WO | 0120774 | 3/2001 |

\* cited by examiner

*Primary Examiner*—Khanh Tran
(74) *Attorney, Agent, or Firm*—Philip Wadsworth; Charles D. Brown; Donald C. Kordich

(57) ABSTRACT

A transmitter 108 converts a complex baseband signal 140 having I and Q quadrature signal components 141 and 142 for transmission by an antenna 114. An intermediate frequency based complex-to-real up-converter 130 uses sub-sampling to convert the complex baseband signal 140 into a real digital signal 144 having digital signal representations 174. An intermediate frequency based bandpass filtering digital-to-analog converter 132 uses Delta-Sigma, bandpass techniques to convert the real digital signal 144 into a first analog signal 146 having analog signal representations 182. A post-conversion bandpass filter 134 isolates and boosts the signal-to-noise ratio of a selected analog signal representation 186 to output a second analog signal 148 having a post-filtered selected analog signal representation 192. A tracking bandpass filter 136 further bandpasses and up-converts the second analog signal 148 to output a transmittable signal 150 having a tracking-filtered selected analog signal representation 196.

26 Claims, 8 Drawing Sheets

TRANSFER CHARACTERISTICS OF THE INTERMEDIATE FREQUENCY BASED BANDPASS FILTERING DIGITAL-TO-ANALOG CONVERTER (IFDAC)

POWER SPECTRA OF INPUT SIGNAL TO IFDAC

POWER SPECTRA OF NOISE PROFILE FOR IFDAC

POWER SPECTRA OF ZERO ORDER HOLD FILTER RESPONSE OF IFDAC

POWER SPECTRA OF OUTPUT SIGNAL FROM IFDAC

TRANSMITTER SYSTEM AND METHOD FOR A WIRELESS COMMUNICATION SYSTEM

RELATED APPLICATIONS

This Application claims priority to U.S. Provisional Application No. 60/313,765, filed on Aug. 20, 2001.

BACKGROUND OF THE INVENTION

1. Technical Field

The present invention relates generally to wireless communication systems and, more particularly, to a transmitter system and method using bandpass Delta-Sigma modulation and advanced bandpass techniques.

2. Description of Related Art

Wireless communication devices, such as cellular telephones, are widely used as a replacement for conventional telephone systems. One advantage of the wireless communication devices is their portability. The user can operate the wireless communication devices from virtually any point on earth. Since component size, weight, and power requirements of the wireless communication device can detrimentally affect portability, they are important factors that directly impact its utility.

For communication to occur, signals are transmitted from and received by components of the wireless communication devices. Transmitters, either separate or part of a transceiver, handle transmission tasks for the wireless communication device. Transmitters typically accept complex baseband signals to be transmitted. These complex baseband signals are internally generated within the wireless communication device and are made up of I and Q quadrature signal components. The transmitters subsequently perform forms of modulation, frequency up-conversion, and power amplification of the baseband signals.

Conventional transmitter architectures include a dual conversion approach and a direct conversion approach. With the dual conversion approach, modulation and up-conversion are to the desired transmission frequency performed in two steps, whereas, the direct conversion approach accomplishes modulation and up-conversion in one step. Additional conventional approaches use a translational loop or a offset phase-locked loop.

With dual conversion transmitters, a modulator performs modulation and a portion of the up-conversion, a second component, an up-converting mixer, performs the rest of the up-conversion. Dual conversion approaches are widely used with conventional transmitters of cellular telephones. When compared to direct conversion approaches, dual conversion approaches have tended to be less problematic. One serious drawback of dual conversion approaches is the need for a local oscillator associated with the modulator and a second local oscillator associated with the up-converting mixer. Use of the second local oscillator is not found with direct conversion approaches. By requiring a second local oscillator, the dual conversion approaches detrimentally increase power requirements of the wireless communication devices.

Although a second local oscillator is not needed for the up-converting mixer with the direct conversion approaches, direct conversion devices typically require the use of costly duplex filters, which have consequently hindered success of direct conversion approaches. The translational loop or the offset phase-locked loop are widely used due to their low output noise eliminating the need for costly duplex filters. However, these additional approaches also use a second local oscillator for the up-conversion portion and thus share the same disadvantage regarding power requirements as the dual conversion transmitter.

If these conventional approaches use quadrature modulation techniques, additional local oscillators are required in which a separate local oscillator and/or separate digital-to-analog converter are used for each of the I and Q quadrature signal components of the complex baseband signals, which further detrimentally affect component size, weight, and power requirements for the wireless communication devices. Furthermore, these conventional approaches suffer from imbalance errors found in typical implementations of the I and Q quadrature signal components of the complex baseband signals. Further requirements are subsequently imposed upon the conventional digital-to-analog converters to address these imbalance errors, which, unfortunately, are only partially resolved by conventional approaches.

Accordingly, there is a significant need for a system and method for a transmitter to modulate, up-convert, and power amplify complex baseband signals in wireless communication devices without the need for additional local oscillators, digital-to-analog converters, duplex filters, and other additional requirements such as the need to remedy imbalance errors between the I and Q quadrature signal components of complex baseband signals. The present invention provides this and other advantages that will become apparent from the following detailed description and accompanying figures.

SUMMARY OF THE INVENTION

The present invention resides in a transmitter system and method for a wireless communication system method. Aspects of the system and method include an intermediate frequency based complex-to-real up-converter configured to digitally sample the complex baseband signal at a sample frequency with a sample frequency value, $F_S$. The intermediate frequency based complex-to-real up-converter is further configured to digitally sample with one or more periodic functions of an intermediate frequency having an intermediate frequency value, $F_{IF}$, to convert the complex baseband signal into a real digital signal having digital signal representations. Each digital signal representation is sized in width along a frequency spectrum substantially equal to a bandwidth, W, and containing substantially the signal content of the complex baseband signal. The digital signal representations have frequencies such that the digital signal representations are spaced along the frequency spectrum in pairs with a mid-position of the bandwidth, W, of each digital signal representation of each pair being displaced, by approximately the intermediate frequency value, either positively or negatively, on either side of one of a plurality of frequencies on the frequency spectrum, each of the plurality of frequencies being equal to a product of an integer multiplied by approximately the sample frequency value.

Other aspects include an intermediate frequency based bandpass filtering digital-to-analog converter being a noise shaped digital-to-analog converter configured to convert the real digital signal into an analog signal having analog signal representations, each sized in width along the frequency spectrum substantially equal to the bandwidth, W, and having substantially the signal content of the complex baseband signal. The analog signal representations are spaced along the frequency spectrum at intervals and frequencies corresponding to the digital signal representations. The analog signal further include noise segments located along the frequency spectrum between the analog signal representations. The intermediate frequency based bandpass filtering digital-to-analog converter has a noise floor with low-noise areas sized in width greater than or substantially equal to the bandwidth, W, and spaced along the frequency spectrum in pairs with each low-noise area of each pair being displaced along the frequency spectrum at intervals and frequencies corresponding to the digital signal representations. The noise floor further includes high-noise areas between the low-noise areas.

Additional aspects include a post-conversion bandpass filter configured to bandpass a selected one of the analog signal representations of the analog signal. A tracking bandpass up-converter is configured to bandpass a selected one of the analog signal representations of the analog signal and to frequency up-convert the selected analog signal representation to include a transmission radio frequency, $F_{RF}$, of the wireless communication system.

Other features and advantages of the invention will become apparent from the following detailed description, taken in conjunction with the accompanying drawings.

DETAILED DESCRIPTION OF THE PREFERRED EMBODIMENTS

Figure 1:
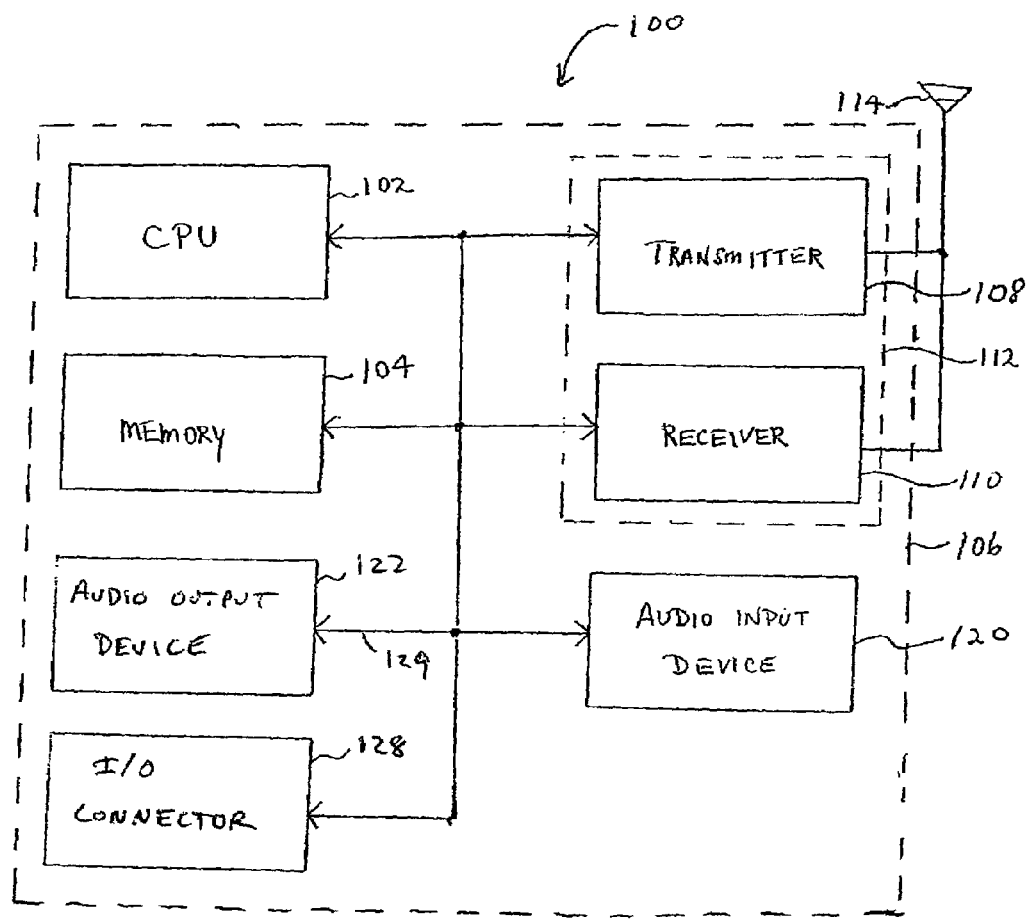
FIG. 1 is a functional block diagram of a system implementing the present invention.

The present invention provides a system and method for a transmitter to sample, convert, modulate, filter, up-convert, and power amplify complex baseband signals for general use in wireless communication devices. As shown in the drawings for purposes of illustration, the present invention is embodied in a system 100 illustrated in the functional block diagram of FIG. 2. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include non-volatile random access memory (NVRAM), such as flash RAM.

The system 100, which is typically embodied in a wireless communication device also includes a housing 106 that contains a transmitter 108 and a receiver 110 to allow transmission and reception of data, such as audio communications, between the system 100 and a remote location, such as a basestation (not shown). The transmitter 108 and receiver 110 may be combined into a transceiver 112. An antenna 114 is attached to the housing 106 and electrically coupled to the transceiver 112. Component and operational details of the transmitter 108 will be described further below. The operation of the receiver 110, and antenna 114 is well known in the art and need not be described herein except as it relates specifically to the present invention.

The system 100 also includes an audio input device 120, such as a microphone, and an audio output device 122, such as a speaker. The audio input device 120 and audio output device 122 are generally mounted in the housing 106. Additional components may also be used in a conventional manner depending on the type of wireless communication device. For example, an analog cellular telephone does not require the digitization of any audio data. In contrast, a digital wireless communication device will require additional components to convert analog audio data to digital form. Although not specifically illustrated in FIG. 1, the audio input device 120 is coupled to an analog-to-digital converter (ADC) which converts analog audio signals to digital form if the system 100 is implemented in a digital wireless communication device. The ADC may be a portion of a voice encoding system, generically referred to as a VOCODER, which encodes the audio data in a known fashion. Similarly, the audio output device 122 is coupled to a digital-to-analog converter (DAC), which converts digital audio data to analog form.

The audio device 122, which is sometimes referred to as a receiver (not to be confused with the receiver 110), may be replaced by an external device (not shown). In an exemplary embodiment, the system 100 may be coupled to external audio devices via an input-output (I/O connector 128). The I/O connector 128 provides a port for audio input and output and may further provide access to control signals and other operational components, such as a keyboard (not shown).

The various components of the system 100 are coupled together by a bus system 129, which may include a power bus, a control signal bus, and a status signal bus in addition to a data bus. However, for the sake of clarity the various buses are illustrated in FIG. 1 as the bus system 129.

One skilled in the art will appreciate that the system 100 illustrated in FIG. 1 is a functional block diagram rather than a listing of specific components. Also, separate functional blocks within the system 100 may, in fact, be embodied in one physical component, such as a digital signal processor (DSP). They may also reside as program codes in the memory 104, such code being operated on by the CPU 102. The same considerations may apply to other components listed in the system 100 of FIG. 1.

In general, aspects of the present invention are combined to ultimately convert a complex baseband signal contained within a narrow baseband portion of the frequency spectrum to a real analog signal being modulated on a carrier wave having a transmission frequency, $F_{RF}$. For example, a complex baseband signal having a bandwidth of the frequency spectrum of 200 kHz is first digitally sampled at a sampling rate, $T_N$, having a sampling frequency, $F_S$, for example, 10 MHz, thereby satisfying the Nyquist criteria, whereas the data rate of the system 100 is about 1 MHz. The digital sampling is done with trigonometric functions having an intermediate frequency $F_{IF}$, for example, of 2.5 MHz. Selection of the sampling frequency, $F_S$, and the intermediate frequency, $F_{IF}$, are discussed further below.

As a result of the digital sampling, the complex baseband signal is converted into a real digital signal having a digital signal representation repeated as harmonics across the frequency spectrum. Each digital signal representation has substantially the entire signal content of the complex baseband signal and each has a width, W, along the frequency spectrum corresponding to the bandwidth of the complex baseband signal. The digital signal representations are positioned at center frequencies along the frequency spectrum that are displaced by the intermediate frequency value on either side of an integer multiple of the sampling frequency, $F_S$. For example, the real digital signal resulting from the digital sampling of the complex baseband signal at a sampling frequency, $F_S$, of 10 MHz and an intermediate frequency, $F_{IF}$, of 2.5 MHz would, for example, have digital signal representations positioned with the center frequency of each representation being plus and minus 2.5 MHz from the integer multiple of the sampling frequency $F_S$ (i.e., n*10.0 MHz±2.5 MHz, where n is an integer). In this example, the digital representations are centered at 7.5 MHz, 12.5 MHz, 17.5 MHz, 22.5 MHz, 27.5 MHz, 32.5 MHz. . . . , 67.5 MHz, 72.5 MHz, . . . , and so on. Those skilled in the art will recognize that other sampling frequencies ($F_S$) and intermediate frequencies ($F_{IF}$) will result in different locations and separations of digital representations along the frequency spectrum. Careful selections of the sampling frequency ($F_S$) and the intermediate frequency ($F_{IF}$) will result in the precise placement of digital representations at selected locations on the frequency spectrum.

Special applications of conventional Delta-Sigma (also referred to as Sigma-Delta) modulation techniques are then used in an advanced digital-to-analog converter (DAC) to tailor the noise floor of the advanced DAC to have low noise portions positioned along the frequency spectrum at the center frequencies that are greater than or approximately equal to the bandwidth, W, of the digital signal representations. This tailoring of the noise floor of the advanced DAC provides a high signal-to-noise ratio for analog versions of the digital signal representations resulting from conversion of the real digital signal to a real analog signal by the advanced DAC even though the bit-level of the DAC is typically significantly lower than conventional designs such as, for example, a one-bit DAC. Tailoring of the DAC noise floor further results in shaping the noise outputted from the DAC into selected frequency bands substantially apart from the signal bands of the DAC output. In other embodiments, shaping of the outputted noise is done with other forms of noise shaped DACs. As with the digital signal representations, each analog signal representation has substantially the entire signal content corresponding to the original real digital signal. Furthermore, the corresponding analog signal representations are also positioned along the frequency spectrum at the center frequencies of the real digital signal.

Various stages of bandpass filtering of the real analog signal are then performed to isolate a selected one of the analog signal representations (for example, having a center frequency of 72.5 MHz) from the other analog signal representations and from noise. The selected analog signal representation is then up-converted, for example, the center frequency of 72.5 MHz is up-converted to a frequency in the vicinity of 900 MHz, for subsequent amplification and transmission.

Figure 2:
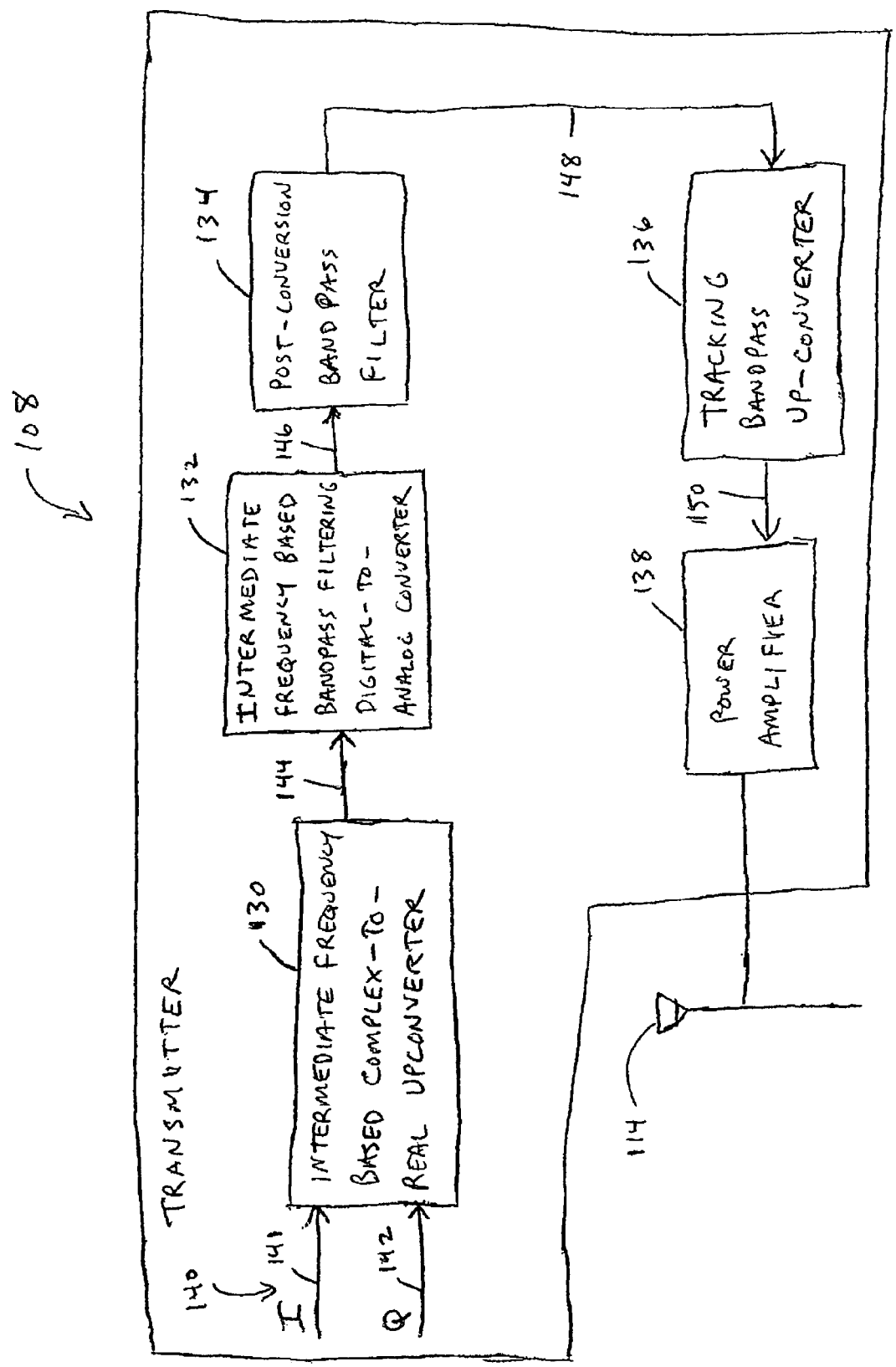
FIG. 2 is a functional block diagram generally depicting a transmitter of the present invention.

According to the present invention, as shown in FIG. 2, the transmitter 108 includes an intermediate frequency based complex-to-real up-converter 130, an intermediate frequency based bandpass filtering digital-to-analog converter (DAC) 132, a post-conversion bandpass filter 134, a tracking bandpass up-converter 136, and a power amplifier 138. The complex-to-real up-converter 130 digitally samples at a sampling frequency, $F_S$, a complex baseband signal 140 having I and Q quadrature signal components 141 and 142, to generate a real digital signal 144 from the complex baseband signal. The sampling frequency, $F_S$, is typically chosen, in some embodiments, to be an even multiple of the data rate (a.k.a., the chipping rate or symbol rate) of the system 100 so that the Nyquist criteria for retaining information content of a sampled signal is satisfied and for other reasons explained below. For example, one chipping rate used with code division multiple access (CDMA) systems is equal to 1.2288 MHz. The digital sampling by the complex-to-real up-converter 130 generates a digital representation with aspects similar to an output of a low-frequency analog I and Q modulator without the imbalance error previously mentioned. The real digital signal 144 is composed of digital signal representations being located along the frequency spectrum on either side of multiples of the sampling frequency, $F_S$, by a displacement equal to an intermediate frequency, $F_{IF}$. Furthermore, each digital signal representation contains the information content of the complex baseband signal.

The intermediate frequency DAC 132 subsequently generates a first analog signal 146 from the real digital signal 144. The first analog signal 146 is generated in such a manner that analog signal representations corresponding with the digital signal representations of the real digital signal 144 are enhanced and isolated from analog signal noise. Due to the unique combination of the intermediate frequency based complex-to-real up-converter 130 and the intermediate frequency based bandpass filtering DAC 132, only one DAC is needed in contrast with conventional approaches, which need two DACs.

With some communication systems, like GSM, a separate DAC is necessary to control power amplification. Because the system 100 requires only one DAC for conversion of the complex baseband signals, if a second DAC is available under certain circumstances, the second DAC can now be used for such control of power amplification and thereby allowing for multimode applications of the system 100.

The post-conversion bandpass filter 134 produces a second analog signal 148 by isolating a particular selected region of the frequency spectrum, having a selected analog signal representation, of the first analog signal 146 from noise and other of the analog signal representations. Consequently, the second analog signal 148 contains a version of the selected analog signal representation that is relatively free of other signals and noise.

The tracking bandpass up-converter 136 actively selects a region of the frequency spectrum of the second analog signal 148 to bandpass filter and further isolate the selected analog signal representation from other signals and noise. Furthermore, the tracking bandpass up-converter 136 up-converts the second analog signal 148 into a transmittable signal 150 having the selected analog signal representation centered on a transmission related radio frequency, $F_{RF}$. The transmittable signal 150 is subsequently amplified by the power amplifier 138 and sent on to the antenna 114 for transmission.

Figure 3A:
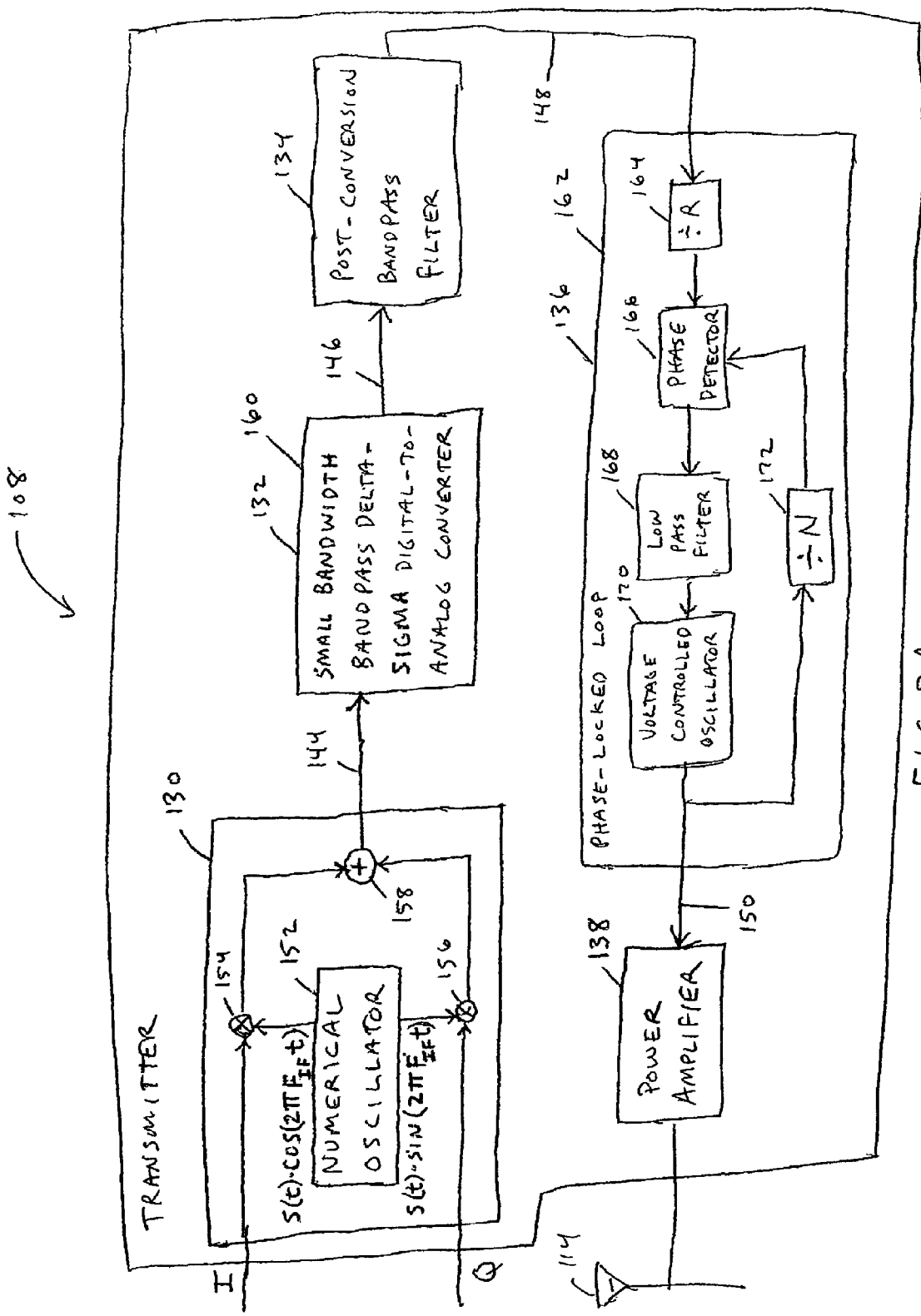
FIG. 3A is a schematic diagram illustrating an embodiment of the transmitter shown in FIG. 2 including embodiments of the intermediate frequency based complex-to-real up-converter, the intermediate frequency based bandpass filtering digital-to-analog converter, and the tracking bandpass up-converter.

Particular embodiments of components of the transmitter 108 are depicted in FIG. 3A according to the present invention. A particular embodiment of the complex-to-real up-converter 130 has a numerical oscillator 152, such as a coordinate rotation digital computer (CORDIC) or a direct digital synthesizer whose general operational principles are known in the art. The numerical oscillator 152 has a first output signal, $S(t) \cdot \cos(2\pi \cdot F_{IF} \cdot t)$, and a second output signal, $S(t) \cdot \sin(2\pi \cdot F_{IF} \cdot t_N)$ wherein $F_{IF}$ is the intermediate frequency, t is the time variable, and sin( ) and cos( ) are trigonometric functions. S(t) is a sample function that outputs a non-zero valued pulse every sampling period, $T_S$, with a sampling frequency, $F_S$. The first output signal joins the I quadrature signal component 141 of the complex baseband signal 140 at a first multiplier junction 154 where the signals are multiplied together relative to the time domain or convolved in the frequency domain. The second output signal joins the Q quadrature signal component 142 of the complex baseband signal at a second multiplier junction 156. Outputs of the first multiplier junction 154 and the second multiplier junction 156 are then combined at a summing junction 158 resulting in the real digital signal 144.

A particular embodiment of the intermediate frequency DAC 132 uses a small bandwidth bandpass Delta-Sigma DAC 160 utilizing special application of Delta-Sigma bandpass techniques, generally known in the art, to achieve desired linearity and signal-to-noise over small bandwidth segments given a zero-order-hold response, $Z_{OH}$, described by Equation 1.

$$Z_{OH} = \frac{1 - e^{-j2\pi f/f_S}}{j2\pi f} \cdot f_S \qquad \text{(Equation 1)}$$

As discussed above, the Delta-Sigma DAC 160 shapes the output noise to generally occur in frequency bands substantially apart from signal bands as is thus a noise shaped DAC.

Figure 3B:
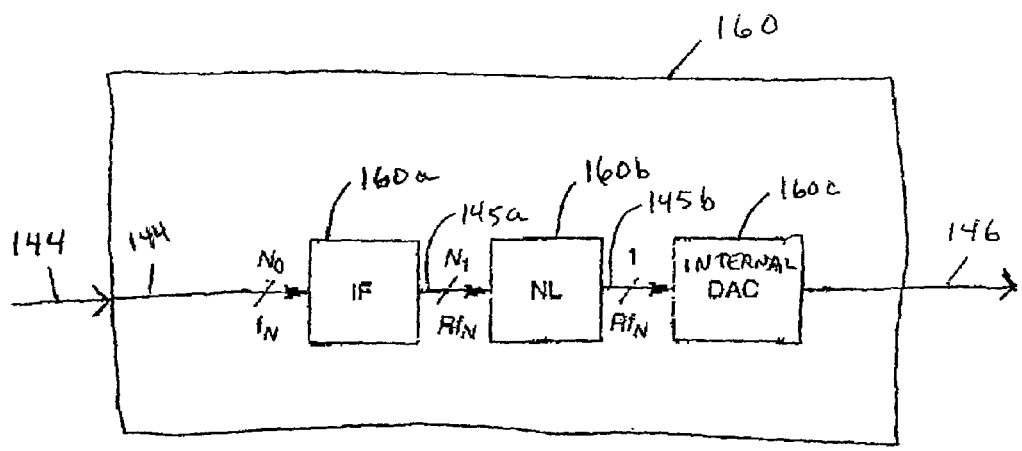
FIG. 3B is a schematic diagram illustrating components of an embodiment of the small bandwidth bandpass Delta-Sigma digital-to-analog converter shown in FIG. 3A.

In other embodiments, other noise shaped DACs can be used for similar effect. Functional components of one embodiment of the Delta-Sigma DAC 160 are shown in FIG. 3B to include an interpolation filter 160a, a noise-shaping loop 160b, and an internal DAC 160c, which is typically a one-bit DAC. The input to the Delta-Sigma DAC 160 is the real digital signal 144, which is a multibit digital signal being a stream of digital words with a word length $N_0$ and a data rate, $f_N$. The data rate, $f_N$, is typically somewhat larger than the Nyquist rate associated with the signal. The interpolation filter 160a outputs an interpolated digital signal 145a with a data rate equal to an oversampling ratio, R, times the data rate, $f_N$, of the real digital signal 144, or expressed as $R \cdot f_N$.

Figure 3C:
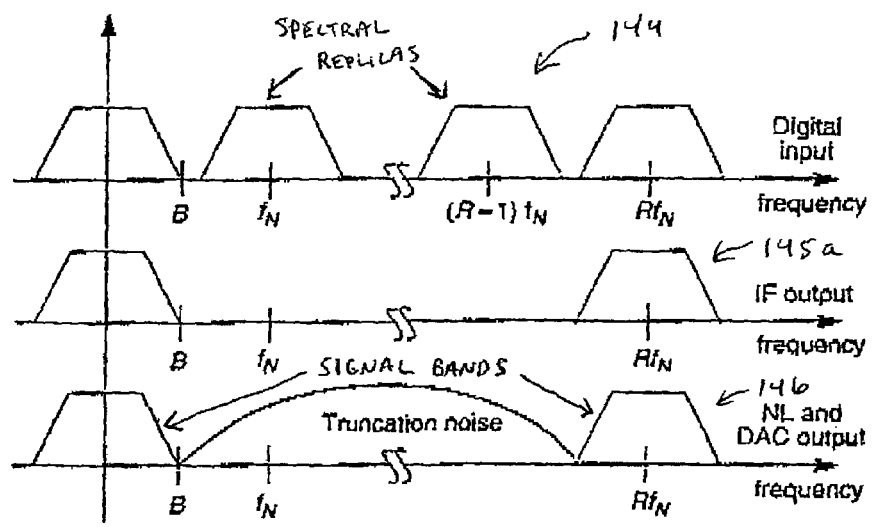
FIG. 3C is collection of frequency plots of the real digital signal, the interpolated signal, the truncated signal, and the first analog signal, all associated with components of the small bandwidth bandpass Delta-Sigma digital-to-analog converter shown in FIG. 3B.

As shown in FIG. 3C, for a given embodiment of the real digital signal 144 with spectral replicas of a portion of the real digital signal centered on zero frequency, such as those spectral replicas centered at frequencies $f_N$, $2f_N$, and so on up to and including $(R-1)f_N$, the interpolation filter 160a suppresses these spectral replicas to output the interpolated digital signal 145a. The word length, $N_1$, of the interpolated digital signal 145a is the same or somewhat smaller than the word length, $N_0$, of the real digital signal 144. The interpolated digital signal 145a is then entered into the noise-shaping loop 160b, which shortens the word length to typically a single bit to output a truncated signal 145b. The noise-shaping loop 160b uses conventional Delta-Sigma techniques to shorten signal word length in such a manner that most of quantization noise power, introduced by the truncation, lies between signal bands of the truncated digital signal 145a similar to that shown for the first analog signal 146 in FIG. 3C.

The truncated digital signal 145a is then converted by the internal DAC 160c to the first analog signal 146. Because the internal DAC 160c is typically a one-bit DAC, implementation complexities are greatly reduced compared with conventional multi-bit DACs that are typically used. Also, since the internal DAC 160c is typically, one-bit, its output response tends to be very linear, which further simplifies implementation. The internal DAC 160c outputs the first analog signal 146, which contains a linear replica of the real digital signal 144 and also contains noise due to quantization error introduced by the noise-shaping loop 160b, as shown in FIG. 3C. Since most of the noise due to quantization error lies outside of the signal bands of the first analog signal 146, this noise can be subsequently filtered out of the first analog signal.

A particular embodiment of the tracking bypass up-converter 136 uses a phase-locked loop 162 having an initial divider 164, a phase detector 166, a low pass filter 168, a voltage controlled oscillator 170, and a second divider 172 arranged according to conventional principles of phase-locked loops. The voltage controlled oscillator 170 is used in the up-conversion process in which the transmission related radio frequency, $F_{RF}$, is typically in some embodiments, in the 900 or 1900 MHz regions of the radio frequency spectrum. Typically, in some embodiments, values for the initial divider 164 and the second divider 172 are set equal to one another to better allow for a tracking bandpass up-conversion function by the phase-locked loop 162. Other embodiments of the tracking bypass up-converter 136 utilize a translational loop or an offset phase-locked loop whose operation is conventionally known.

Figure 4:
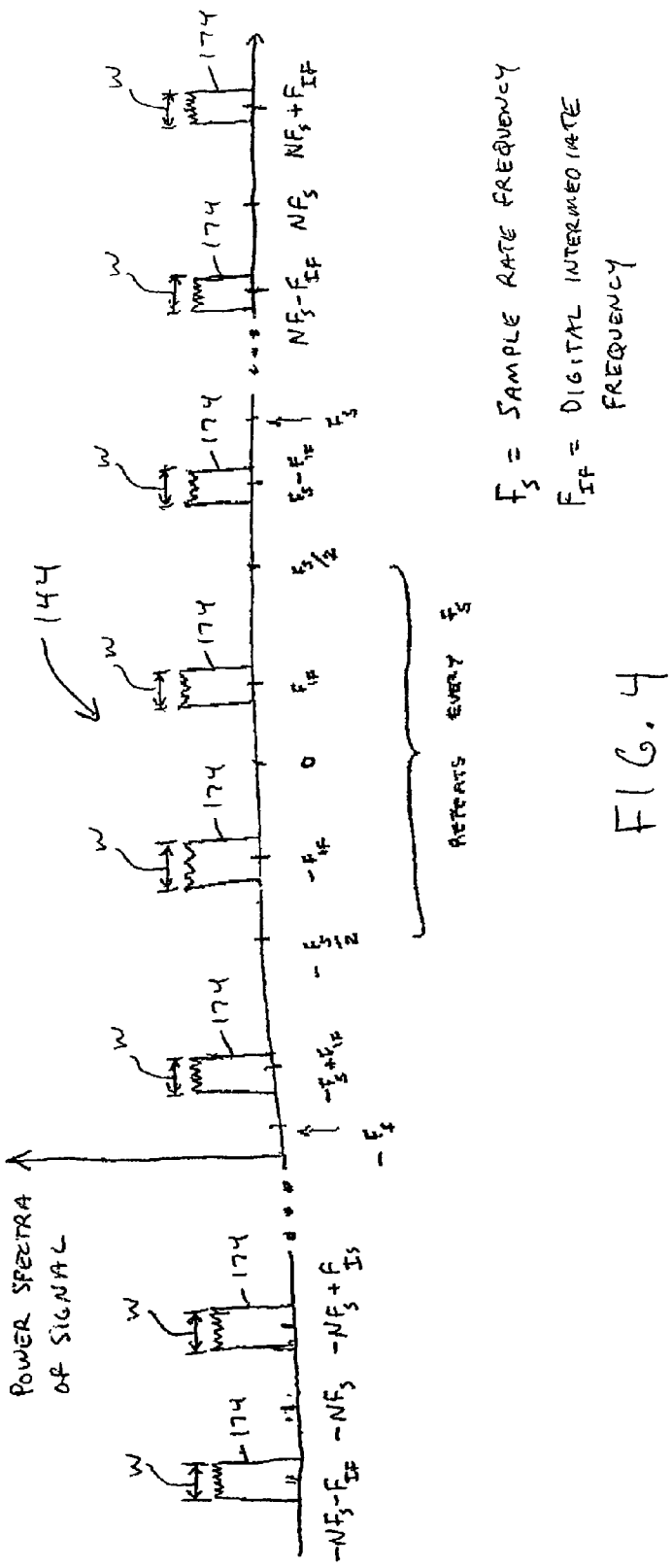
FIGS. 4 and 5 are frequency plots of the real digital signal outputted by the intermediate frequency based complex-to-real up-converter shown in FIG. 2, and more particularly by a numerical oscillator based version of the intermediate frequency based complex-to-real up-converter shown in FIG. 3A.

An exemplary depiction of the real digital signal 144 is illustrated in FIG. 4 showing digital signal representations 174, each having a bandwidth, W, and each containing the signal content of the complex baseband signal 140. As shown in FIG. 4, the digital signal representations 174 are disbursed along the frequency spectrum in pairs, with each of the pairs being located on opposite sides of an integer multiple of the sampling frequency, $F_S$. Each of the pair of the digital signal representations 174, are displaced from their integer multiple of the sampling frequency, $F_S$, by a displacement frequency equal to the intermediate frequency, $F_{IF}$.

To assist in subsequent isolation of a selected one of the digital signal representations 174, the sampling frequency, $F_S$, is selected so that the digital signal representations are spaced sufficiently far from one another and the intermediate frequency, $F_{IF}$, is selected so that the digital signal representations 174 are substantially evenly spaced from one another. To ensure that the digital signal representations 174 are spaced sufficiently far from one another, the sampling frequency, $F_S$, is chosen to be relatively high. As mentioned above, typically in some embodiments, the sampling frequency is chosen to be an even multiple, such as a multiple of four or eight, of the data rate (a.k.a., chipping rate or symbol rate) of the system 100. To ensure that the digital signal representations 174 are substantially evenly spaced from one another, the intermediate frequency, $F_{IF}$, typically in some embodiments, is equal to one-fourth of the sampling frequency, $F_S$.

Figure 5:
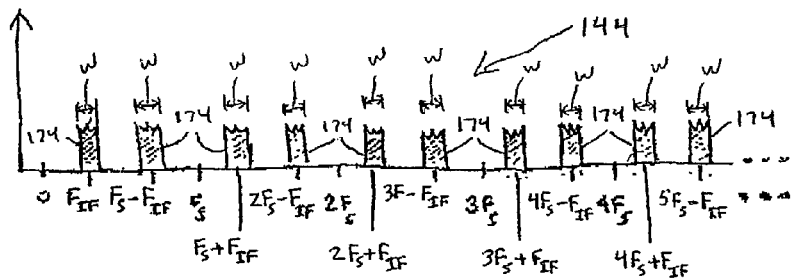

Transfer characteristics of the intermediate frequency DAC 132 are better understood by comparing FIGS. 5–8. For illustrative purposes, the real digital signal 144, shown in FIGS. 4 and 5, is aligned with a noise floor 175, shown in FIG. 6, a zero-order-hold filter response 178, shown in FIG. 7, and the first analog signal 146, shown in FIG. 8, of the intermediate frequency DAC 132. For embodiments of the intermediate frequency DAC 132 using special applications of conventional Delta-Sigma bandpass techniques, Delta-Sigma digital-to-analog converters are chosen with high dynamic range and small bandwidth bandpass characteristics.

Figure 6:
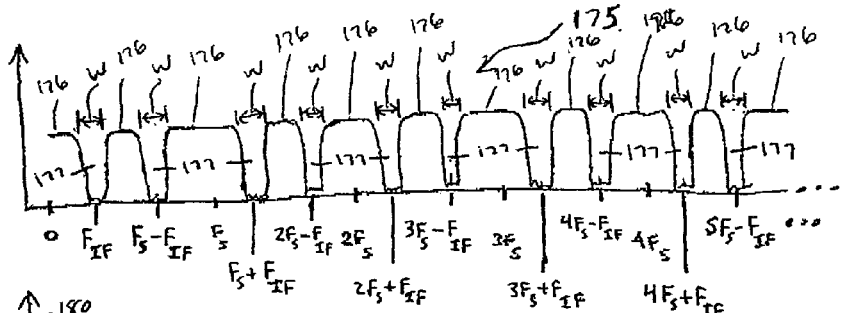
FIG. 6 is a frequency plot of the noise floor of the intermediate frequency based bandpass filtering digital-to-analog converter shown in FIG. 2, and more particularly of the small bandwidth bandpass Delta-Sigma digital-to-analog converter shown in FIG. 3A.

As shown in FIG. 6, the noise floor 175 of the intermediate frequency digital-to-analog converter 132 contains a multitude of noise plateaus 176 separated by small bandwidth low-noise areas 177 having a bandwidth approximately equal to the bandwidth, W, of the digital signal representations 174. Also, the low-noise areas 177 of the noise floor 175 are particularly disbursed along the frequency spectrum in the same manner as the disbursement for the digital signal representations 174 in which the low-noise areas are centered on frequencies of which the digital signal representations are also substantially centered. By so shaping and aligning the noise floor 175 along the frequency spectrum as approximately an inverted image of the real digital signal 144, the first analog signal 146 can be generated with higher signal-to-noise content.

Figure 7:
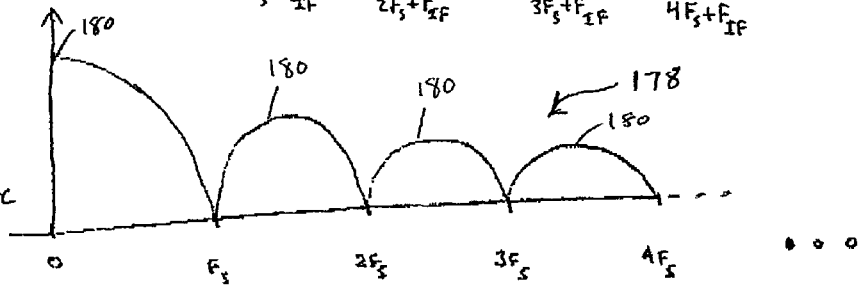
FIG. 7 is a frequency plot of the zero-order-hold filter response of the intermediate frequency based bandpass filtering digital-to-analog converter shown in FIG. 2, and more particularly of the small bandwidth bandpass Delta-Sigma digital-to-analog converter shown in FIG. 3A.
Figure 8:
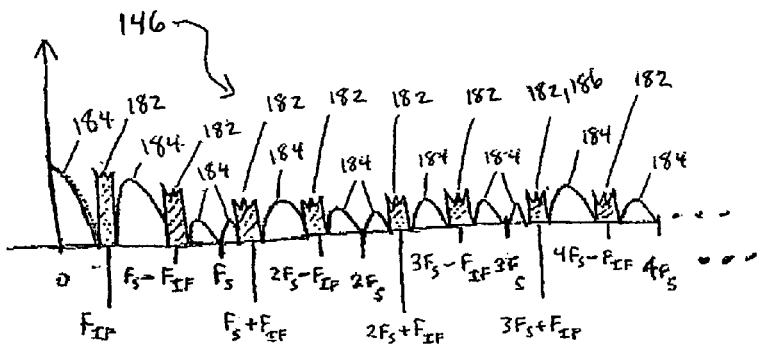
FIG. 8 is a frequency plot of the first analog signal outputted by the intermediate frequency based bandpass filtering digital-to-analog converter shown in FIG. 2, and more particularly of the small bandwidth bandpass Delta-Sigma digital-to-analog converter shown in FIG. 3A.

The real digital signal 144, as shown in FIG. 5, is converted to analog form based on the noise floor 175, as shown in FIG. 6, and filter segments 180 of the zero-order-hold filter response 178, as shown in FIG. 7, resulting in the first analog signal 146, as shown in FIG. 8. As stated above, the first analog signal 146 contains analog signal representations 182 corresponding to the digital signal representations 174 of the real digital signal 144 that are enhanced and isolated with respect to the analog signal noise resultant from the digital-to-analog conversion, shown in FIG. 8 as noise segments 184. The analog signal representations 174 have typical signal-to-noise ratios greater than 65 dB in some cases and greater than 70 dB in other cases. On the other hand, the noise segments 184 typically have near zero dB signal-to-noise ratios with maximum signal-to-noise ratios for the noise segments being no more than 60 dB in some embodiments and being no more than 50 dB in other embodiments.

Figure 9:
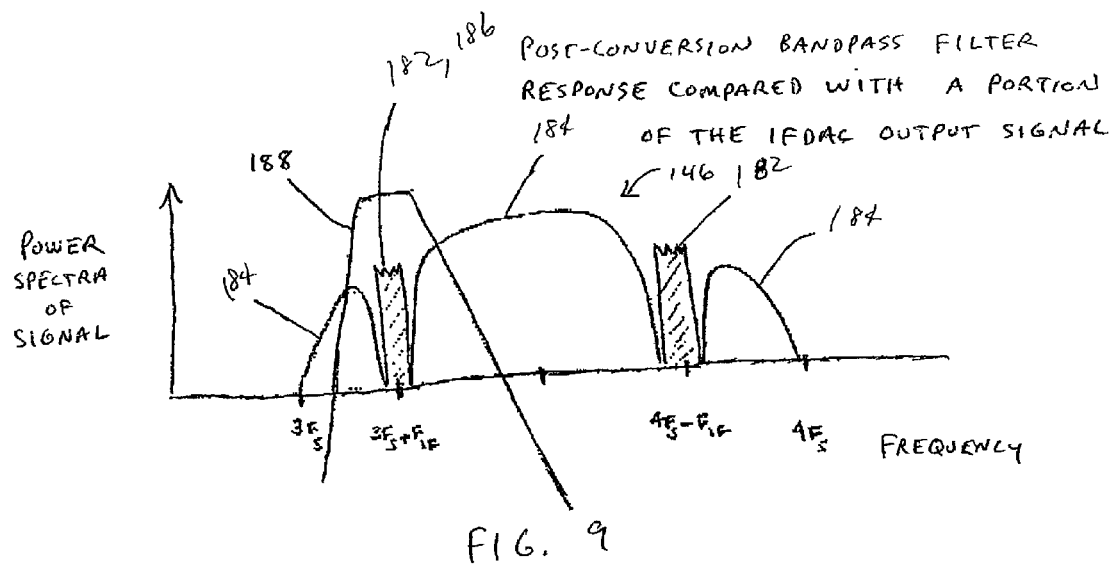
FIG. 9 is a frequency plot of a portion of the first analog signal outputted by the intermediate frequency based bandpass filtering digital-to-analog converter as compared to the filter response of the post-conversion bandpass filter both shown in FIGS. 2 and 3A.
Figure 10:
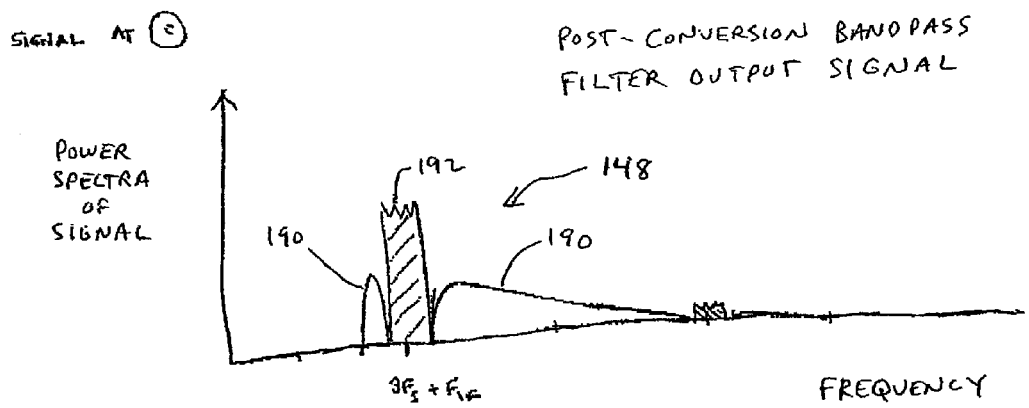
FIG. 10 is a frequency plot of the second analog signal outputted by the post-conversion bandpass filter shown in FIGS. 2 and 3A.

The post-conversion bandpass filter 134 is then used to isolate and further enhance a particular selected region of the first analog signal 146 in which the particular selected region has, for example, a selected analog signal representation 186. As shown in FIG. 9, the post-conversion bandpass filter 134 has a filter response 188 with a narrow bandwidth and centered upon the selected analog signal representation 186. Output of the post-conversion bandpass filter 134 results in the second analog signal 148 as shown in FIG. 10 having noise portions 190 significantly smaller than a post-filtered selected analog signal representation 192.

Figure 11:
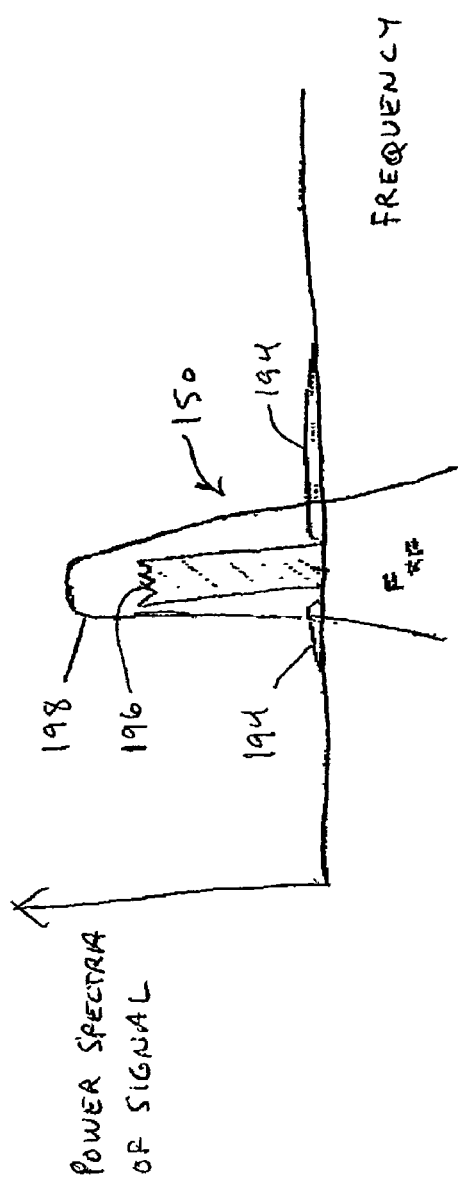
FIG. 11 is a frequency plot of the transmittable signal outputted by the tracking bandpass up-converter shown in FIG. 2, and more particularly by the phase-locked loop shown in FIG. 3A.

Further enhancement of the post-filtered selected analog signal representation 192 is performed by the tracking bandpass up-converter 136 resulting in the transmittable signal 150 having a tracking-filtered selected analog signal representation 196, as shown in FIG. 11. Furthermore, due to the additional bandpass affect of the tracking bandpass up-converter 136, the transmittable signal 150 has noise portions 194 that are additionally reduced compared with the noise portions 190 of the second analog signal 148. Due to this further enhancement feature of the tracking bandpass up-converter 136, the cost of the post-conversion bandpass filter 134 may be reduced.

Typically, one requirement of the tracking bandpass up-converter 136 is that the frequency of the center frequency position for the post-filtered selected analog signal representation 192, received by the tracking bandpass up-converter, be high enough so that there is enough rejection by the tracking bandpass up-converter of the other analog signal representations. The sampling frequency, $F_S$, for digital sampling by the complex-to-real up-converter 130 is chosen to aid in addressing this requirement.

For illustrative purposes, an exemplary filter response 198 of the tracking bandpass up-converter 136 is shown with respect to the transmittable signal 150, showing in particular, the tracking-filtered selected analog signal representation 196. It is to be understood that the filter response 198 of the tracking bandpass up-converter 136 is used during up-conversion of the second analog signal 148 to center the tracking-filtered selected analog signal representation 196 of the resultant transmittable signal 150 on to the transmission radio frequency, $F_{RF}$, associated with the particular system 100.

One skilled in the art will appreciate that the transmitter 108 illustrated in FIGS. 2 and 3A is a functional block diagram rather than a listing of specific components. For example, although the intermediate frequency based complex-to-real up-converter 130 and the intermediate frequency digital-to-analog converter 132 are illustrated as two separate blocks within the transmitter 108, they may be in fact embodied in one physical component, such as a digital signal processor (DSP). They may also reside as program codes in the memory 104, such code being operated on by the CPU 102. The same considerations may apply to other components listed in the transmitter 108 of FIGS. 2–3A.

It is to be understood that even though various embodiments and advantages of the present invention have been set forth in the foregoing description, the above disclosure is illustrative only, and changes may be made in detail yet remain within the broad principles of the invention. Therefore, the present invention is to be limited only by the claims.

What is claimed is:

1. A system for processing of a complex baseband signal having a signal content for signal transmission from a wireless communication system, the wireless communication system having a data rate, the system comprising:

an intermediate frequency based complex-to-real up-converter configured to digitally sample the complex baseband signal at a sample frequency with a sample frequency value, FS, and configured to digitally sample with one or more periodic functions of an intermediate frequency having an intermediate frequency value, FIF, to convert the complex baseband signal into a real digital signal having digital signal representations with each digital signal representation sized in width along a frequency spectrum substantially equal to a bandwidth, W, and containing substantially the signal content of the complex baseband signal, the digital signal representations having frequencies such that the digital signal representations are spaced along the frequency spectrum in pairs with a mid-position of the bandwidth, W, of each digital signal representation of each pair being displaced, by approximately the intermediate frequency value, either positively or negatively, on either side of one of a plurality of frequencies on the frequency spectrum, each of the plurality of frequencies being equal to a product of an integer multiplied by approximately the sample frequency value; and an intermediate frequency based bandpass filtering digital-to-analog converter being a noise shaped digital-to-analog converter configured to convert the real digital signal into an analog signal having analog signal representations, each sized in width along the frequency spectrum substantially equal to the bandwidth, W, and having substantially the signal content of the complex baseband signal, the analog signal representations being spaced along the frequency spectrum at intervals and frequencies corresponding to the digital signal representations, the analog signal further including noise segments located along the frequency spectrum between the analog signal representations, the intermediate frequency based bandpass filtering digital-to-analog converter having a noise floor with low-noise areas sized in width greater than or substantially equal to the bandwidth, W, and spaced along the frequency spectrum in pairs with each low-noise area of each pair being displaced along the frequency spectrum at intervals and frequencies corresponding to the digital signal representations, the noise floor further including high-noise areas between the low-noise areas.

2. The system of claim 1, further comprising a post-conversion bandpass filter configured to bandpass a selected one of the analog signal representations of the analog signal.

3. The system of claim 1 wherein the sample frequency, FS, is approximately an even multiple of the data rate of the wireless communication system.

4. The system of claim 1 wherein the intermediate frequency, FIF, is substantially one-fourth of the sample frequency, FS.

5. The system of claim 1 wherein the intermediate frequency based complex-to-real up-converter further comprises a numerical oscillator configured to output two signals described, in part, by two or more terms involving trigonometric functions of the intermediate frequency, FIF.

6. The system of claim 5 wherein the numerical oscillator is a direct digital synthesizer.

7. The system of claim 1, further comprising a tracking bandpass up-converter configured to bandpass a selected one of the analog signal representations of the analog signal and to frequency up-convert the selected analog signal representation to include a transmission radio frequency, FRF, of the wireless communication system.

8. The system of claim 7 wherein the transmission radio frequency, FRF, is near one of the following frequencies: 900 MHz and 1900 MHz.

9. The system of claim 7 wherein the tracking bandpass up-converter is either a translational loop or an offset phase-locked loop.

10. The system of claim 7 wherein the tracking bandpass up-converter is a phase-locked loop.

11. The system of claim 10 wherein the phase-locked loop further comprises an initial divider and a second divider, both the initial divider and the second divider having substantially equal values.

12. The system of claim 11 wherein the phase locked loop further comprises a voltage controlled oscillator configured for the transmission radio frequency, FFR, of the wireless communication system.

13. A system for processing of a complex baseband signal having a signal content for signal transmission from a wireless communication system, the wireless communication system having a data rate, the system comprising:

a complex-to-real up-converter configured to digitally sample the complex baseband signal at a sample frequency having a sample frequency value, FS, and configured to digitally sample with one or more trigonometric functions of an intermediate frequency having an intermediate frequency value, FIF, to convert the complex baseband signal into a real digital signal having a plurality of digital signal representations, each digital signal representation containing substantially the signal content of the complex baseband signal; and a bandpass filtering digital-to-analog converter including a one-bit internal digital-to-analog converter, the bandpass filtering digital-to-analog converter configured to convert the real digital signal into an analog signal having analog signal representations each having substantially the signal content of the complex baseband signal and each being in a portion of a frequency spectrum.

14. The system of claim 13 wherein the sample frequency, FS, is approximately an even multiple of the data rate of the wireless communication system.

15. The system of claim 13 wherein the intermediate frequency, FIF, is substantially one-fourth of the sample frequency, FS.

16. The system of claim 13 wherein each digital signal representation is sized in width along a frequency spectrum substantially equal to a bandwidth, W, and wherein the bandpass filtering digital-to-analog converter has a noise floor with low noise areas sized in width greater than or substantially equal to the bandwidth, W, and located in the frequency spectrum corresponding to the locations of the digital signal representations.

17. The system of claim 13, further comprising a post-conversion bandpass filter configured to bandpass a selected one of the analog signal representations of the analog signal.

18. The system of claim 17, further comprising a tracking bandpass up-converter configured to bandpass the selected one of the analog signal representations of the analog signal.

19. A system for processing of a complex baseband signal having a signal content for signal transmission from a wireless communication system, the wireless communication system having a data rate, the system comprising:

an intermediate frequency based complex-to-real up-converter configured to digitally sample the complex baseband signal at a sample frequency having a sample frequency value, FS, and configured to digitally sample with one or more trigonometric functions of an intermediate frequency having an intermediate frequency value, FIF, to convert the complex baseband signal into a real digital signal having a plurality of digital signal representations each having substantially the signal content of the complex baseband signal, the digital signal representations having frequencies such that the digital signal representations are paired along a frequency spectrum with each digital signal representation of each pair being displaced, by approximately the intermediate frequency value, either positively or negatively, on either side of one of a plurality of frequencies on the frequency spectrum, each of the plurality of frequencies being equal to a product of an integer multiplied by approximately the sample frequency value; and a post-conversion bandpass filter configured to bandpass a selected one of a plurality of analog signal representations, the plurality of analog signal representations corresponding to the plurality of digital signal representations.

20. The system of claim 19, further comprising a tracking bandpass up-converter configured to additionally bandpass the selected analog signal representation of the analog signal and to frequency up-convert the selected analog signal representation based upon a transmission radio frequency, FRF, of the wireless communication system.

21. A system for processing of a digital signal having a signal content of a complex baseband signal for signal transmission from a wireless communication system, the wireless communication system having a data rate, the system comprising:

an intermediate frequency based bandpass filtering digital-to-analog converter being a noise shaped digital-to-analog converter configured to convert the digital signal into an analog signal, the digital signal having digital signal representations with each digital signal representation sized in width along a frequency spectrum substantially equal to a bandwidth, W, the digital signal representations having frequencies such that the digital signal representations are spaced along the frequency spectrum in pairs with one digital signal representation of each pair being displaced, either positively or negatively, on either side of one of a plurality of frequencies of the frequency spectrum, the analog signal having analog signal representations, each sized in width along the frequency spectrum substantially equal to the bandwidth, W, having substantially the signal content of the complex baseband signal, the analog signal representations being spaced along the frequency spectrum at intervals and frequencies corresponding to the digital signal representations, the analog signal further having noise segments located on the frequency spectrum between the analog signal representations; and a tracking bandpass up-converter configured to additionally bandpass a selected analog signal representation of the analog signal and to frequency up-convert the selected analog signal representation to a transmission radio frequency, FRF, of the wireless communication system wherein the intermediate frequency based bandpass filtering digital-to-analog converter has a noise floor with low-noise areas sized in width greater than or substantially equal to the bandwidth, W, and is spaced along the frequency spectrum in pairs with each low-noise area of each pair being displaced along the frequency spectrum at intervals and frequencies corresponding to the digital signal representations such that the analog signal representations have signal-to-noise ratios at least 10 dB greater than the signal-to-noise ratios of the noise segments of the analog signal.

22. The system of claim 21, further comprising a post-conversion bandpass filter configured to bandpass the selected analog signal representation of the analog signal prior to bandpassing and up-conversion of the selected analog signal representation by the tracking bandpass up-converter.

23. A method for processing of a complex baseband signal having a signal content for signal transmission from a wireless communication system, the wireless communications system having a data rate, the method comprising:

digitally sampling the complex baseband signal at a sample frequency, FS, having a sample frequency value and with one or more periodic functions an associated intermediate frequency, FIF, having an intermediate frequency value, to convert the complex baseband signal into a real digital signal having digital signal representations each with substantially the same signal content of the complex baseband signal, the digital signal representations having frequencies such that the digital signal representations are paired along a frequency spectrum with each digital signal representation of each pair being displaced, by approximately the intermediate frequency value, either positively or negatively, on either side of one of a plurality of frequencies on the frequency spectrum, each of the plurality of frequencies being equal to a product of an integer multiplied by approximately the sample frequency value; and bandpassing a selected analog signal representation of a plurality of analog signal representations, the plurality of analog signal representations corresponding to the digital signal representations to isolate the selected analog signal representation from the remaining of the plurality of analog signal representations and from the noise segments positioned along the frequency spectrum between the analog signal representations.

24. The method of claim 23, further comprising further bandpassing the bandpassed selected analog signal representation in conjunction with frequency up-converting the selected analog signal representation to include a transmission radio frequency, FRF, of the wireless communication system.

25. A method for processing of a complex baseband signal having a signal content for signal transmission of a wireless communication system, the wireless communications system having a data rate, the method comprising:

converting a real digital signal into an analog signal using a one-bit digital-to-analog converter, the real digital signal having digital signal representations with each digital signal representation sized in width along a frequency spectrum substantially equal to a bandwidth, W, and having substantially the signal content of the complex baseband signal, the digital signal representations having frequencies such that the digital signal representations are spaced along the frequency spectrum in pairs with one digital signal representation of each pair being displaced either positively or negatively, on either side of one of a plurality of frequencies of the frequency spectrum, the analog signal having analog signal representations and noise segments positioned on the frequency spectrum between the analog signal representations, each analog signal representation sized in width along the frequency spectrum substantially equal to the bandwidth, W, having substantially the signal content of the complex baseband signal, the analog signal representations being spaced along the frequency spectrum at intervals and frequencies corresponding to the digital signal representations; and bandpassing a selected analog signal representation of the analog signal in conjunction with frequency up-converting the selected analog signal representation to include a transmission radio frequency, FRF, of the wireless communication system.

26. The method of claim 25, further comprising bandpassing the selected analog signal representation of the analog signal prior to the bandpassing in conjunction with frequency up-conversion of the selected analog signal representation.

* * * * *